(12) United States Patent
Nakatsuka

(10) Patent No.: US 10,970,580 B2
(45) Date of Patent: Apr. 6, 2021

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Tadanori Nakatsuka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 39 days.

(21) Appl. No.: 16/139,987

(22) Filed: Sep. 24, 2018

(65) Prior Publication Data

US 2019/0102645 A1   Apr. 4, 2019

(30) Foreign Application Priority Data

Oct. 3, 2017   (JP) .............................. JP2017-193520

(51) Int. Cl.
| | |
|---|---|
| *G06K 9/34* | (2006.01) |
| *G06K 9/20* | (2006.01) |
| *G06T 11/60* | (2006.01) |
| *H04N 1/00* | (2006.01) |
| *G06F 40/10* | (2020.01) |

(52) U.S. Cl.
CPC ............. *G06K 9/344* (2013.01); *G06F 40/10* (2020.01); *G06K 9/2081* (2013.01); *G06T 11/60* (2013.01); *H04N 1/00* (2013.01); *G06K 2209/01* (2013.01)

(58) Field of Classification Search
CPC .. G06K 9/344; G06K 9/2081; G06K 2209/01; G06F 40/10; H04N 1/00; H04N 1/40062; H04N 1/3871; H04N 1/38; H04N 1/32112; H04N 1/00331; H04N 1/444; H04N 1/448; G06T 11/60
See application file for complete search history.

(56) References Cited

U.S. PATENT DOCUMENTS

| | | | |
|---|---|---|---|
| 5,696,841 A | 12/1997 | Nakatsuka | 382/174 |
| 5,703,962 A | 12/1997 | Niki et al. | 382/173 |
| 6,504,540 B1 | 1/2003 | Nakatsuka | 345/433 |
| 2014/0153830 A1* | 6/2014 | Amtrup | H04N 1/40 382/190 |
| 2015/0341370 A1* | 11/2015 | Khan | H04L 63/20 726/30 |
| 2016/0005202 A1 | 1/2016 | Yamazaki et al. | G06T 11/60 |

FOREIGN PATENT DOCUMENTS

| | | |
|---|---|---|
| JP | 2009-251655 | 10/2009 |
| JP | 2012-227738 | 11/2012 |

* cited by examiner

*Primary Examiner* — Dhaval V Patel
(74) *Attorney, Agent, or Firm* — Venable LLP

(57) ABSTRACT

To appropriately perform blotting out processing for a portion that a user intends to prevent from being displayed for an electronic document having text information on a character string for search, along with image information. The information processing apparatus according to the present invention, in a case where the electronic document is an electronic document in a format searchable for a character string and where a character string obtained by performing OCR processing for a character image object existing in an area and a character string of an invisible text object existing in the area do not match with each other, a setting unit performs re-setting of an area to which blotting out processing is applied for at least one of the character image object and the invisible text object so that both the character strings match with each other.

17 Claims, 10 Drawing Sheets

INFORMATION PROCESSING APPARATUS, INFORMATION PROCESSING METHOD, AND STORAGE MEDIUM

BACKGROUND OF THE INVENTION

Field of the Invention

The present invention relates to a technique to perform blotting out for an electronic document.

Description of the Related Art

Conventionally, as a document management method, a method of digitizing a paper document by scanning the paper document has been widely used. Then, there is a technique to save a document as an electronic document searchable for a character string by incorporating OCR results of an image object in which a character in a scanned image is represented as a text object of a transparent character in the scanned image at the time of digitization. FIG. 1A is a diagram showing a creation process of an electronic document in the PDF format searchable for a character string (hereinafter, described as "SPDF"). In the following, a creation procedure is explained.

1) Extract an image object in which a character is represented (hereinafter, called "character image") and an image object of a background other than a character (hereinafter, called "background image") by analyzing a scanned image.

2) Perform OCR processing for the extracted character image and acquire information on a character string corresponding to the character image.

3) Combine a text object of a transparent character (character whose glyph is unvisualized, hereinafter, called "invisible text"), which corresponds to the character string acquired by the OCR processing, with the background image and the character image.

By the procedure as above, it is possible to obtain an SPDF. By performing image processing (smoothing, color processing, and so on) suitable to a character for the character image and image processing (resolution conversion, image compression, and so on) suitable to a background for the background image before performing combination, it is also possible to obtain a highly compressed SPDF of high image quality. However, the image processing before combination is not the indispensable constituent element in the present invention, to be described later. For example, it is also possible to obtain an SPDF by combining OCR results with an original scanned image as invisible text, and it is also possible to apply the present invention to the SPDF such as this. FIG. 1B is a diagram showing a structure of a page of an SPDF and shows a position relationship between the portion of a character image and invisible text, which is OCR results. As shown in FIG. 1B, a character image 10 and invisible text for search, which corresponds to the character image 10, are arranged in a layer structure at positions 11 and 13, respectively, within the page. In an application that creates the SPDF such as this, invisible text for search is arranged so as to approximately match with a corresponding character image. In this case, on a condition that the position coordinates (and character size) are specified for each character so as to match with the position of each character in the character image for the invisible text, the correspondence relationship between both completely matches with each other. However, in the case where the position coordinates are specified for each character, the file size of an electronic document becomes large. Consequently, in an application that creates the SPDF such as this, the position of invisible text is specified in units of character string rows (in the case of FIG. 1B, the unit is made up of five character string rows) within the character image in many cases. For example, by specifying the top position coordinates of the character string row and the character pitch (or character size), it is possible to arrange the invisible text, which is the OCR results, in the character string row at the intervals of the specified character pitches in order from the specified top position coordinates. At this time, it is difficult to accurately specify the font used in the character string row within the character image and it is only required to guarantee search capability, and therefore, in many cases, a predetermined font (in the example in FIG. 1B, Arial font) specified in advance is used in invisible text. As described above, in the case where the font of the character image and the font of the invisible text are different in the SPDF in which the position of the invisible text is specified in units of character string rows, a possibility that the correspondence relationship of the character position shifts as the second half of the character string rows is reached becomes strong. However, in the case where the purpose is limited to search as described above, there is no trouble even though the position somewhat shifts.

On the other hand, some applications capable of creating an electronic document, such as an SPDF, include a function called blotting out for deleting confidential information. FIG. 2A and FIG. 2B are diagrams showing an example in which blotting out is performed for the page of the SPDF shown in FIG. 1B. In the case where a user specifies an area 21 enclosing "Today" within a character string row 20 (FIG. 2A) and performs blotting out for the character image 10 as a target displayed on a UI screen, not shown schematically, in the character image, the specified area 21 is covered with a black rectangle 22 (FIG. 2B). Then, in the invisible text that is added for search, the portion corresponding to "Today" that overlaps the specified area 21 is deleted and only "more than ever" is left. As a result of this, in the character image, it is no longer possible to restore the area filled in black (that is, the area is covered with a black rectangle) and in the invisible text, it is no longer possible to restore the text information corresponding to the deleted "Today" portion. By making use of the blotting out function, it is made possible to make illegible confidential information within an electronic document.

As described above, at the time of creation of an SPDF, there is a case where the position of the character image within the page and the position of the invisible text for search shift from each other. In the case where the blotting out function is applied to the SPDF including such a shift in position, such a problem may occur that confidential information desired to be deleted is not deleted, or that information desired to be kept is deleted erroneously. FIG. 3A and FIG. 3B show a specific example thereof. Each character image in FIG. 3A and FIG. 3B is drawn in different kinds of font. It is assumed that for each of the character string rows of the character images that use these different kinds of font, invisible text in a predetermined font is arranged at a predetermined character pitch with the position coordinates of the top character (here, "T") as a reference. Then, it is assumed that blotting out is specified for the range of a broken-line rectangle 300 as a target in the character image in FIG. 3A and for the range of a broken-line rectangle 310 as a target in the character image in FIG. 3B. In FIG. 3A, the invisible text located at the position corresponding to the specified area is the portion of "Today mo" and in FIG. 3B, the invisible text located at the position corresponding to the specified area is the portion of "Toda". That is, performing blotting out processing in this state will result in that the portion of the invisible text, which is not intended to be deleted by a user, is deleted in the case of FIG. 3A, and that part of the invisible text, which is intended to be deleted by a user, is left in the case of FIG. 3B.

Regarding this point, as a technique to improve the performance of the blotting out function, for example, there are Japanese Patent Laid-Open No. 2009-251655 and Japanese Patent Laid-Open No. 2012-227738. In Japanese Patent Laid-Open No. 2009-251655, in the case where a user specifies a keyword, the portion that matches with the keyword is masked for the character string, and for the image, the portion that matches with the keyword is filled in black or the like by performing OCR. In Japanese Patent Laid-Open No. 2012-227738, the position coordinates of a mask area (area to be blotted out) specified by a mouse are corrected based on the position coordinates of a circumscribed rectangle of the character image. By these techniques of Japanese Patent Laid-Open No. 2009-251655 and Japanese Patent Laid-Open No. 2012-227738, it is not possible to deal with the above-described problem.

First, the technique of Japanese Patent Laid-Open No. 2009-251655 aims at shutting off detrimental information in digital contents and for all the portions that match with the keyword specified in advance, the processing, such as blotting out, is performed. However, in the case of the blotting out processing aiming at hiding confidential information, there is a case where the character string does not correspond to confidential information depending on the description location even though the character string is the same. That is, it is not originally possible to apply the technique of Japanese Patent Laid-Open No. 2009-251655 to a situation in which blotting out is performed only for a specific area specified by a user as a target. Further, because of its purpose, it is necessary to perform OCR processing for the entire range of the image contents, and therefore, the processing load is heavy. On the other hand, the technique of Japanese Patent Laid-Open No. 2012-227738 can be said to be adaptive to the blotting out processing aiming at hiding confidential information in that the technique aims at masking output prohibited area without fail, such as a character string that is desired to be hidden, of the image read by a scanner. However, in Japanese Patent Laid-Open No. 2012-227738, in the case where there is a shift between the mask area specified on the monitor and the circumscribed rectangle of the character image, the shift is corrected, but the case where invisible text is included is not taken into consideration. Consequently, even in the case where the area to be blotted out is corrected in the character image, on a condition that the position of the invisible text is shifted from the position of the corresponding character image, there may be a case where the contents of the invisible text to be deleted originally and the contents to be deleted actually do not match with each other. That is, even by applying the technique of Japanese Patent Laid-Open No. 2012-227738, it is not useful for resolving the above-described problem unique to an SPDF.

As above, by the techniques of Japanese Patent Laid-Open No. 2009-251655 and Japanese Patent Laid-Open No. 2012-227738, which do not suppose an electronic document, such as an SPDF, as a processing target, it is not possible to deal with the above-described problem resulting from a shift in position between the character image and the invisible text.

SUMMARY OF THE INVENTION

The information processing apparatus according to the present invention is an information processing apparatus having a blotting out function of an electronic document, the information processing apparatus including: a setting unit configured to set an area to which blotting out processing is applied, wherein the area is specified by a user; and a blotting out processing unit configured to fill the inside of the area set by the setting unit for a character image object and to delete text information within the area set by the setting unit for a text object, of objects included in the electronic document, and in a case where the electronic document is an electronic document in a format searchable for a character string and where a character string obtained by performing OCR processing for a character image object existing in the area and a character string of an invisible text object existing in the area do not match with each other, the setting unit performs re-setting of an area to which blotting out processing is applied for at least one of the character image object and the invisible text object so that both the character strings match with each other.

Further features of the present invention will become apparent from the following description of exemplary embodiments with reference to the attached drawings.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

<System Configuration Diagram>

Figure 4:
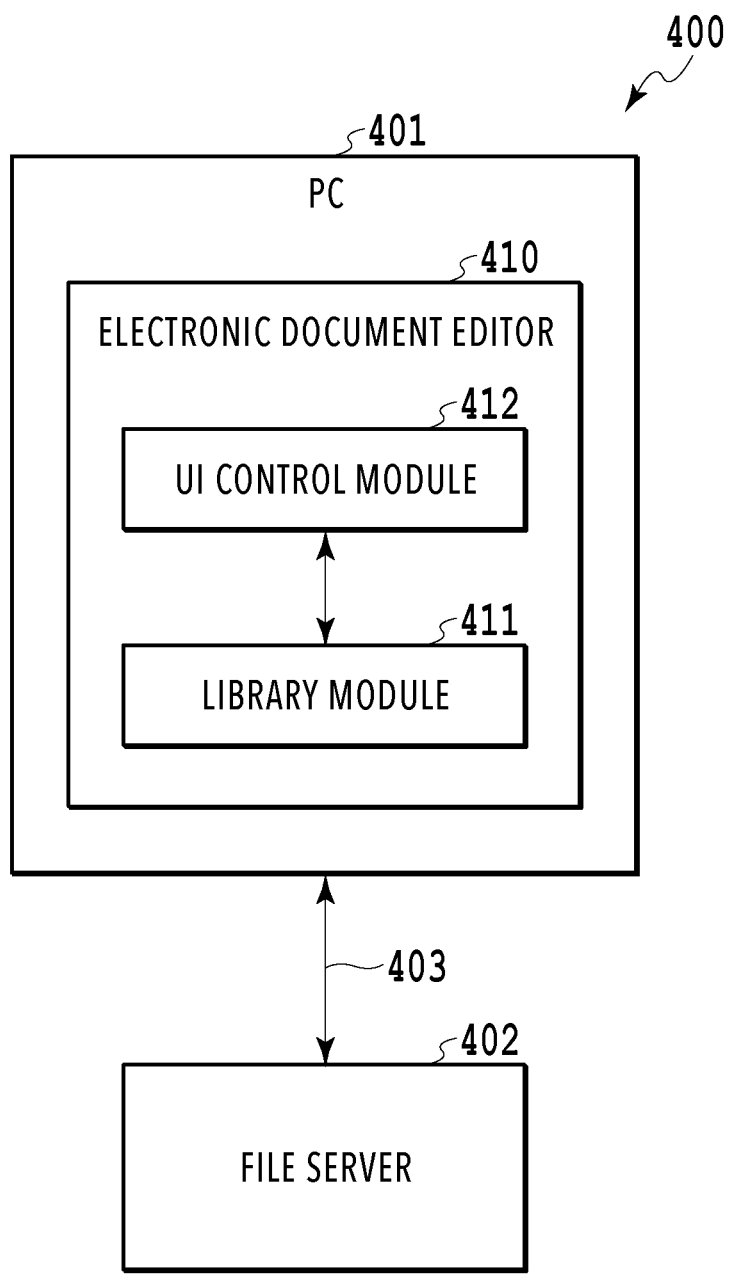
FIG. 4 is a diagram showing a general configuration of a system that manages an electronic document.

FIG. 4 is a diagram showing a general configuration of a system that manages an electronic document. A system 400 includes a PC 401, which is an information processing apparatus as a client, and a file server 402 and the PC 401 and the file server 402 are connected to each other via a network 403, such as a LAN. In the CPU 401, an electronic document editor 410 is installed as an application capable of editing an electronic document. It is possible for a user to create, edit, and print an electronic document in a predetermined format (here, PDF) searchable for a character string. However, the format of an electronic document that is the target of the present invention is not limited to the PDF. Any electronic document searchable for a character string, to which blotting out processing can be applied, and having a function in common to an SPDR described previously may be the target. The electronic document editor 410 includes two software components. One is a library module 411 and this is a component that performs processing of an SPDF, such as generation and editing. The other one is a UI control module 412 and this provides a user interface at the time of a user creating or editing an SPDF, specifically, generates and displays a UI screen, receives a user operation via the UI screen, and so on. The SPDF generated and edited by the electronic document editor 410 is saved in a local file system of the PC 401 or in the file server 402. The PC 401 communicates with the file server 402 via the network 403.

Figure 5:
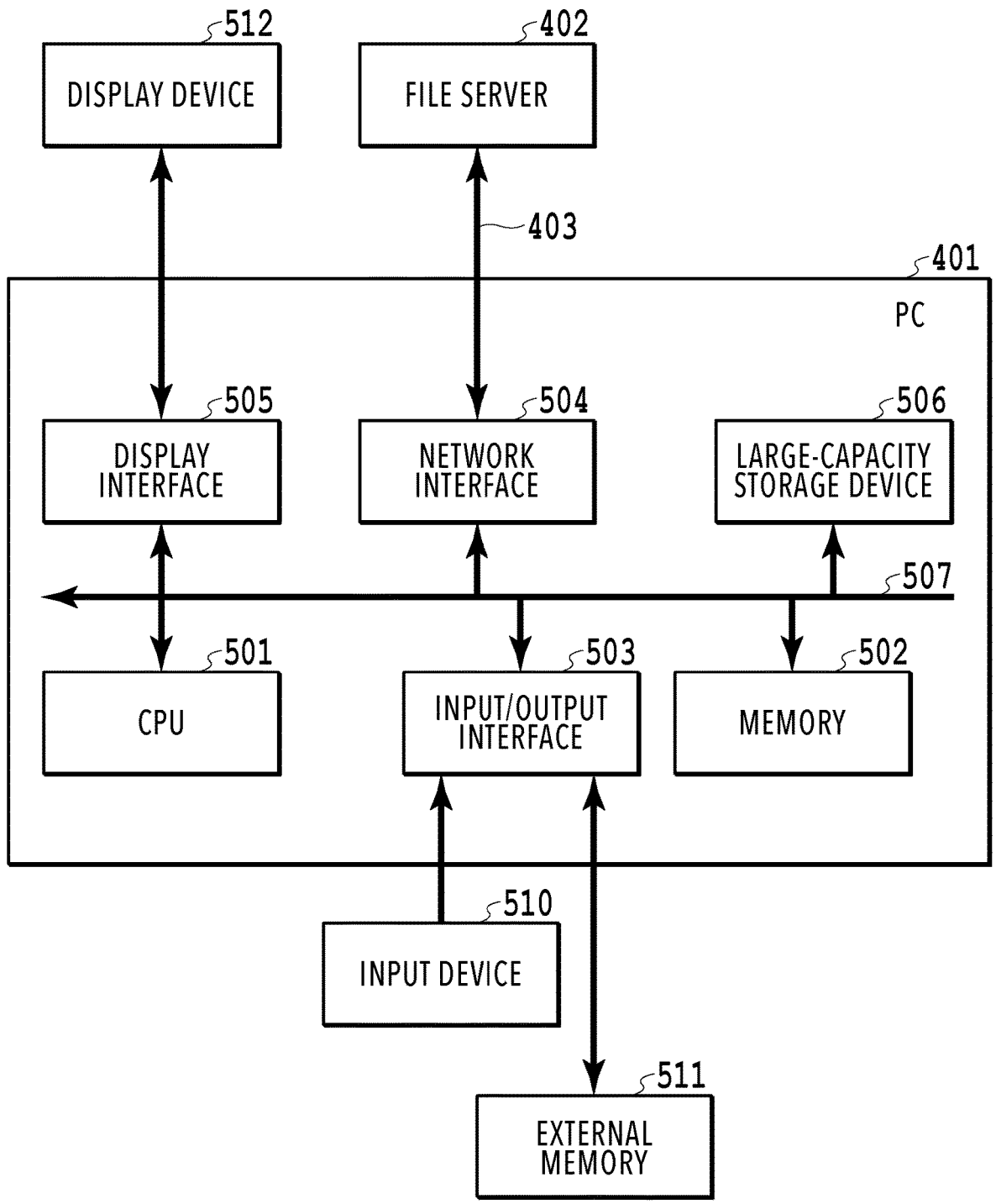
FIG. 5 is a diagram showing an example of a hardware configuration of a PC.

FIG. 5 is a diagram showing an example of a hardware configuration of the PC 401. The PC 401 includes a CPU 501, a memory 502, an input/output interface 503, a network interface 504, a display interface 505, a large-capacity storage device 506, and a system bus 507.

The CPU 501 implements various kinds processing, such as generation and editing of an SPDF by the electronic document editor 410 described above, by causing predetermined programs to run, which are stored in the large-capacity storage device 506, such as an HDD. The memory 502 functions as a main memory, a work area, and so on of the CPU 501. The input/output interface 503 is an interface that connects an input device 510, such as a mouse and a keyboard, and an external memory 511, such as a memory card, to the system bus 507. The network interface 504 is an interface that performs communication control with the file server 402 via the network 403. It is made possible for the PC 401 to perform bidirectional communication with the file server 402 or another external device (for example, printer and the like) via the network interface 504. The display interface 505 is an interface that controls a display of a display device 512.

<Operation of Electronic Document Editor>

Figure 6:
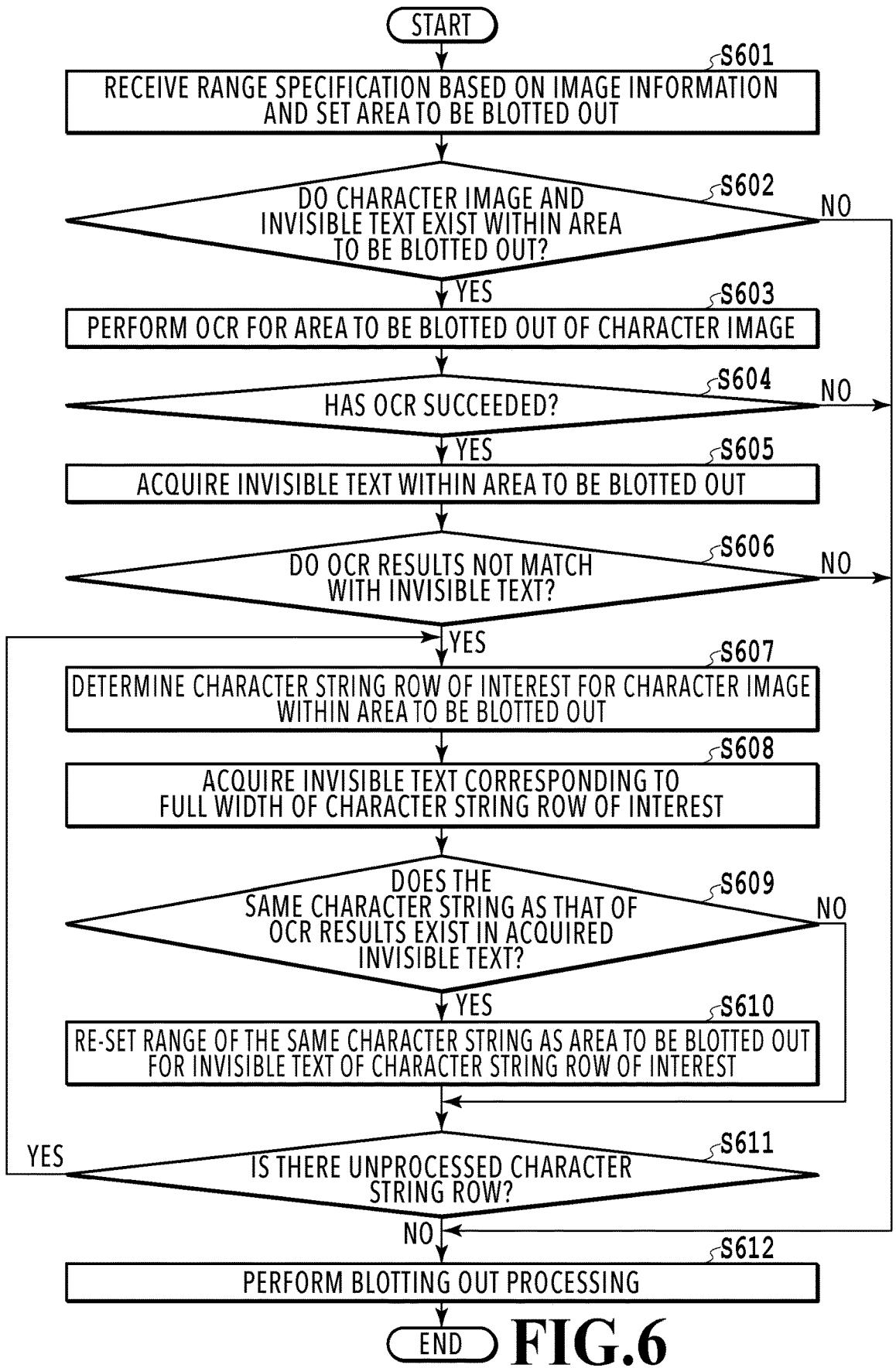
FIG. 6 is a flowchart showing a flow of operation control of an electronic document editor according to a first embodiment.

Following the above, the operation control in the electronic document editor 410 at the time of performing blotting out processing by taking an SPDF as a target is explained. FIG. 6 is a flowchart showing a flow of the operation control of the electronic document editor 410 according to the present embodiment. In the present embodiment, in the case where a user specifies a range that the user desires to blot out based on image information within a page, OCR processing is performed for the character image in the specified range and based on the obtained OCR results, an area to be blotted out of the invisible text is re-set. The series of processing shown in FIG. 6 is implemented by a predetermined program being read onto the memory 502 by a user activating the electronic document editor 410 and being executed by the CPU 501. In the following, detailed explanation is given along the flow in FIG. 6.

Figure 7:
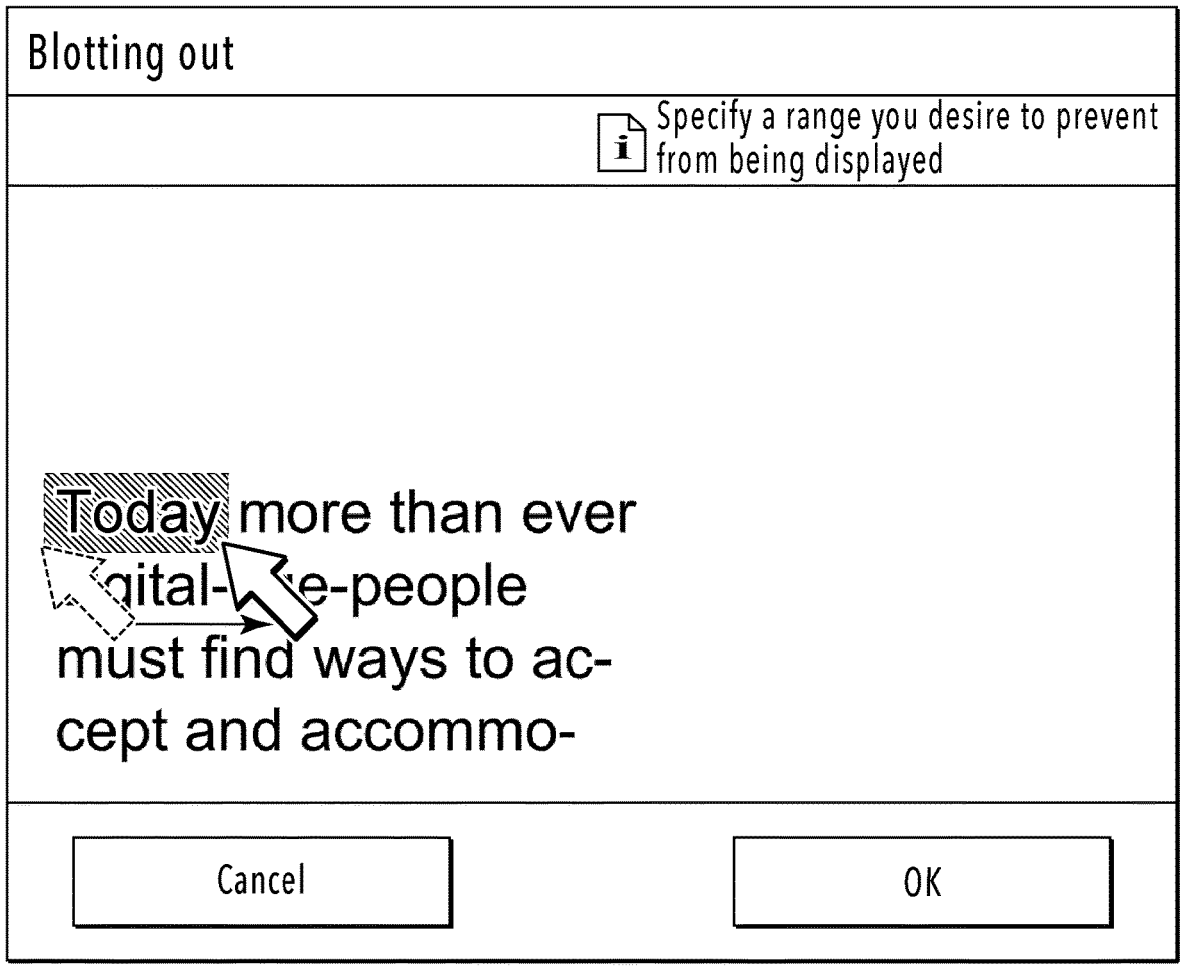
FIG. 7 is a diagram showing an example of a UI screen that is used in the first embodiment.

At step 601, on the UI screen displayed on the display device 512, specification of an image range in which confidential information or the like is described, which a user desires to prevent from being displayed by performing blotting out within a page, is received via the input device 510, such as a mouse. FIG. 7 shows an example of a UI screen used in the present embodiment. Then, an area to be blotted out is set in accordance with the image range specified by a mouse and the like.

At step 602 that follows, whether a character image and invisible text exist within the set area to be blotted out is determined. In this determination processing, whether the processing-target electronic document is an SPDF and blotting out taking a character as a target is performed is determined. For example, in the example in FIG. 3A and FIG. 3B, within the set area to be blotted out, for the character image, the image area of the broken-line rectangle 300 or 310 exists, and for the invisible text, the character string of "Today mo (FIG. 3A)" or "Toda (FIG. 3B)" exists. Consequently, in this case, it is determined that the character image and the invisible text exist. In the case where both the character image and the invisible text exist within the set area to be blotted out as described above, the processing advances to step 603. On the other hand, in the case where both the character image and the invisible text do not exist (for example, the case where the character image exists, but the corresponding invisible text is not embedded, and the like) within the set area to be blotted out, the processing advances to step 612. At step 612 in this case, the normal blotting out processing is performed for the area to be blotted out set at step 601. That is, all the objects that overlap the area in which a range is specified are covered with a black rectangle or the like, or deleted.

At step 603, OCR processing is performed by taking the character image existing in the area to be blotted out set at step 601 as a target. For example, in the example in FIG. 3A described previously, for the character image, the range of the broken-line rectangle 300 exists within the area to be blotted out, and therefore, as long as the image quality of the character image is good, the character string of "Today" is extracted by OCR processing. Then, at step 604, whether the OCR processing has succeeded and a character string is extracted is determined. In the case where the OCR processing has succeeded, the processing advances to step 605. On the other hand, in the case where the OCR processing has failed (it is not possible to extract a character string with a predetermined or higher character recognition accuracy), the processing advances to step 612 and the normal blotting out processing is performed as in the case where No at step 602. That is, the area to be blotted out set at step 601 is taken as a target, the character image is covered with a black rectangle or the like and the invisible text is deleted.

At step 605, the character string of the invisible text existing in the area to be blotted out set at step 601 is acquired. In the example in FIG. 3A described previously, the character string of "Today mo" is acquired. Then, at step 606, whether the character string of the invisible text acquired at step 605 matches with the character string extracted by the OCR processing at step 603 is determined. In the case where the results of the determination indicate that both character strings do not match with each other, the processing advances to step 607. For example, in the example in FIG. 3A described previously, the character string extracted by the OCR processing is "Today", but the character string of the invisible text acquired at step 605 is "Today mo". In this case, both the character strings do not match with each other, and therefore, the processing advances to step 607. On the other hand, in the case where both the character strings match with each other, the processing advances to step 612 and the normal blotting out processing is performed. That is, the area to be blotted out set at step 601 is taken as a target, and the character image is covered with a black rectangle or the like and the invisible text is deleted.

Figure 1A:
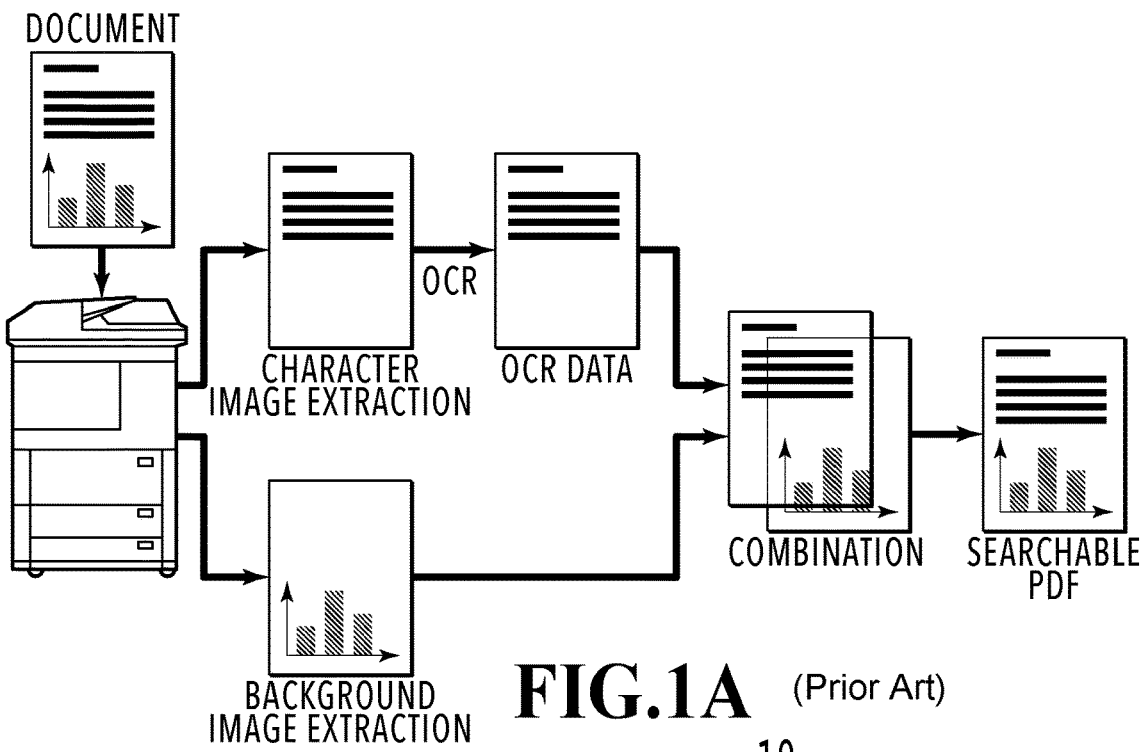
FIG. 1A is a diagram explaining a creation process of an SPDF and FIG. 1B is a diagram showing a page structure of an SPDF.
Figure 1B:
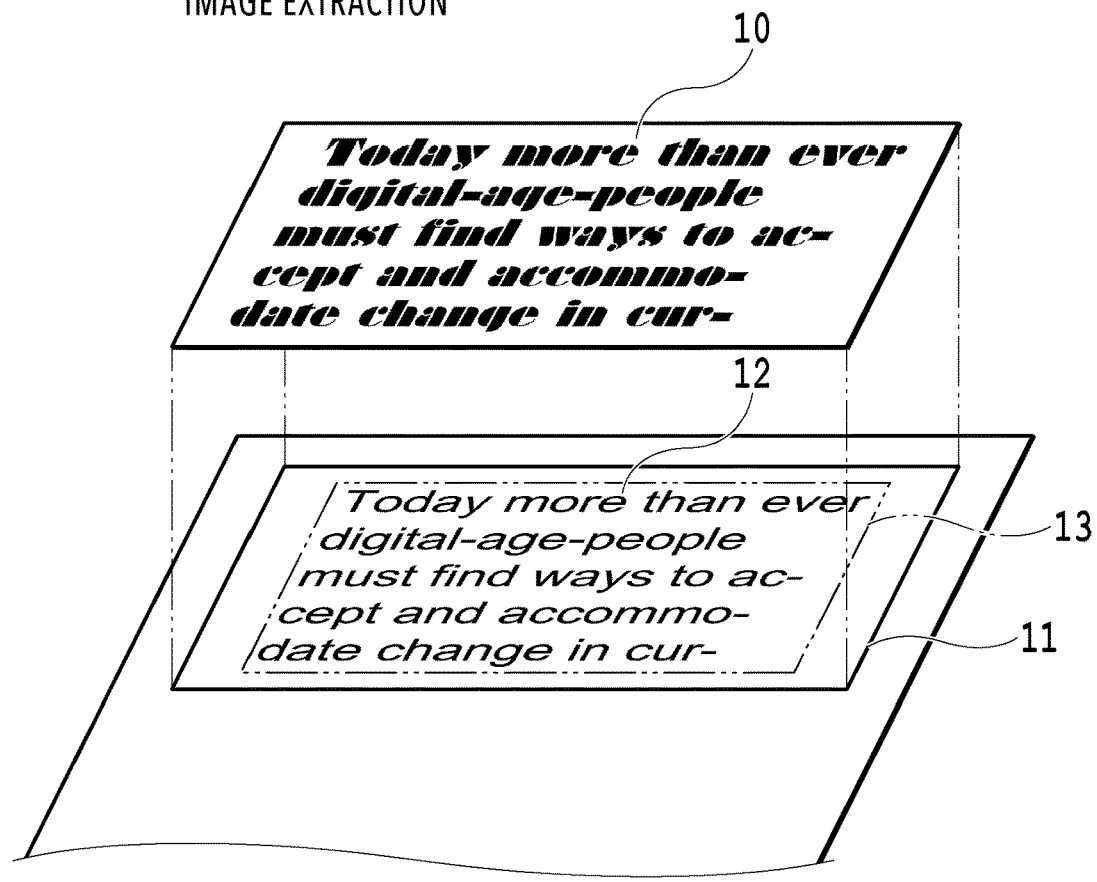
Figure 2A:
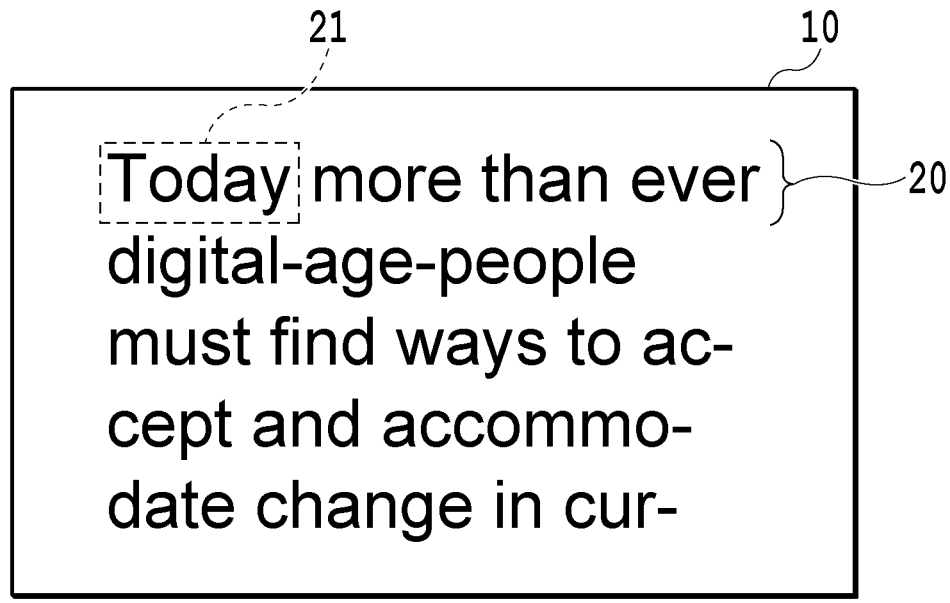
FIG. 2A and FIG. 2B are diagrams showing an example in which blotting out is performed for the page of the SPDF.
Figure 2B:
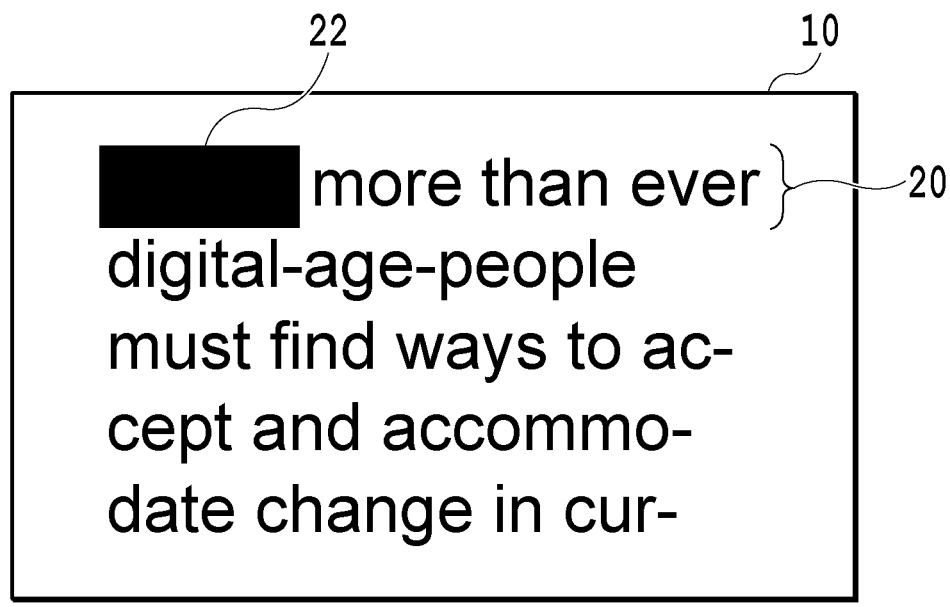

At step 607, for the character image existing in the area to be blotted out set at step 601, a character string row of interest is determined. Specifically, in the case where the character image existing in the area to be blotted out is made up of a plurality of character string rows, for example, the character string row of interest is determined in the order from the character string row whose position coordinate is the highest. In the case where there exists only one character string row, the character string row is determined to be the character string row of interest as it is. The character string row determined here exceeds the width of the area specified by a user and the full width corresponding to one row is taken to be a target. For example, in the example in FIG. 3A described previously, the range specified by a user is the range of the broken-line rectangle 300, but what is determined as the character string row of interest at this step is the entire character string row 20 (see FIG. 2A).

At step 608, the invisible text corresponding to the range wider in the width direction than the area set at step 601 (for example, the full width of the character string row of interest) of the determined character string row of interest is acquired. For example, it is assumed that the acquisition range is set to the full width of the character string row of interest. In this case, on a condition that the character string row 20 (see FIG. 2A) is determined as the character string row of interest, the character string "Today more than ever" of the invisible text corresponding thereto is acquired. However, the acquisition range is not limited to the full width and for example, it may also be possible to determine the acquisition range by specifying in advance the range as a range twice in the width direction the area set at step 601 and the like, and to take the full width only in the case where the doubled range exceeds the full width.

At step 609, whether the same character string as that of the OCR results exists in the character string of the invisible text acquired at step 608 is determined. In the example in FIG. 3A and FIG. 3B described previously, in the character string "Today more than ever" of the acquired invisible text, the character string "Today" extracted by the OCR processing is included, and therefore, it is determined that the same character string exists. In the case where the results of the determination indicate that the same character string exists, the processing advances to step 610. On the other hand, in the case where the same character string does not exit, the processing advances to step 611.

Figure 3A:
FIG. 3A and FIG. 3B are diagrams explaining a problem in the case where conventional blotting out is performed for the SPDF.
Figure 3B:
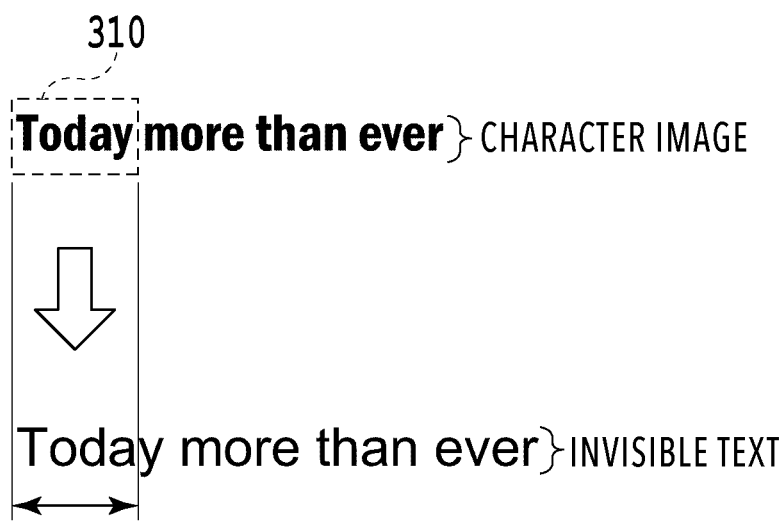

At step 610, of the character string of the invisible text corresponding to the full width of the character string row of interest, the range of the same character string as the character string extracted by the OCR processing is re-set as an area to be blotted out for the invisible text. In the case of FIG. 3A and FIG. 3B described previously, the portion of "Today" of "Today more than ever" as the character string of the invisible text is re-set as a new area to be blotted out for the invisible text corresponding to the character string row of interest. That is, the area to be blotted out set at step 601 is maintained as effective for the character image and the range is changed only for the invisible text.

At step 611, whether there is an unprocessed character string row in the character image existing in the area to be blotted out set at step 601 is determined. In the case where there is an unprocessed character string row, the processing returns to step 607, and the next character string row of interest is set and the processing is continued. On the other hand, in the case where all the character string rows have been processed, the processing advances to step 612.

At step 612, the blotting out processing is performed for the area to be blotted out set at step 601 (or re-set at step 610) as a target. That is, the character image is covered with a black rectangle or the like and the invisible text is deleted. In the example in FIG. 3A and FIG. 3B described previously, for the character image, the range of the broken-line rectangle 300 or 310 is covered with a black rectangle or the like, and for the corresponding invisible text, the portion of "Today" is deleted and only the character string of "more than ever" is left. That is, for the invisible text, in the example in FIG. 3A, the state where more than necessary is deleted is corrected and in the example in FIG. 3B, the state where deletion is insufficient is corrected.

The above is the contents of the operation control of the electronic document editor 410 according to the present embodiment. In the flow in FIG. 6 described above, the area to be blotted out for the invisible text is re-set, but what is required is to be capable of deleting the text information in the invisible text so that there occurs no discrepancy between the area to be blotted out for the invisible text and the portion that is blotted out for the character image, and therefore, the process of re-setting is not necessarily indispensable. That is, in the case where it is determined that the same character string as that of the OCR results exists at step 609, it may also be possible to store information on the character string in advance and perform deletion of the invisible text by referring to the information at step 612. Further, in the present embodiment, explanation is given by taking the case where characters are written from left to right as an example, but it is also possible to apply the present embodiment to the case where characters are written from top to bottom.

According to the present embodiment, in the case where a user specifies a range to be blotted out based on image information for a character searchable electronic document, even on a condition that the position of the character image and the position of the invisible text for search shift from each other, it is made possible to perform blotting out while preventing a discrepancy between the character string of the invisible text and the character image from occurring. Further, the target of the OCR processing is limited to a partial area, not the entire page, and therefore, the time required for the OCR processing is short.

Second Embodiment

In the first embodiment, the aspect is explained, in which in the case where an area to be blotted out is set in accordance with range specification based on image information, by re-setting the range to which blotting out processing is applied for invisible text for search as needed, no discrepancy is caused to occur between the character image and the invisible text. Next, an aspect is explained as a second embodiment, in which in the case where a user performs a character search for confidential information and the like that the user desires to blot out and the user sets an area to be blotted out based on the character string of the hit invisible text, no discrepancy is caused to occur between the character image and the invisible text. Explanation of the contents in common to those of the first embodiment is omitted and in the following, the operation control in the electronic document editor 410 at the time of performing blotting out processing for an SPDF as a target, which is the different point, is explained mainly.

Figure 8:
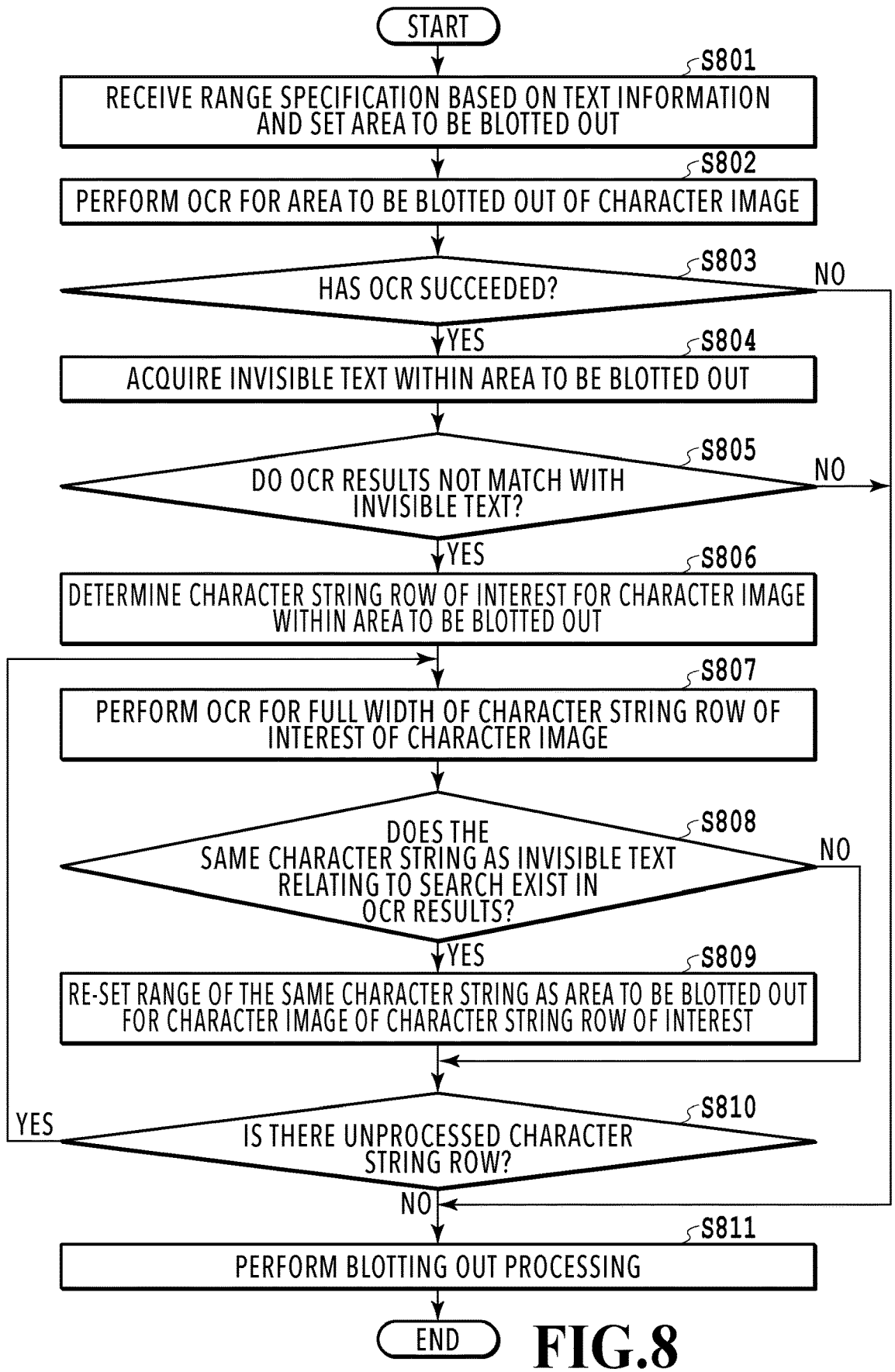
FIG. 8 is a flowchart showing a flow of operation control of an electronic document editor according to a second embodiment.

FIG. 8 is a flowchart showing a flow of the operation control of the electronic document editor 410 according to the present embodiment. In the present embodiment, in the case where a user specifies a range for which a user desires to perform blotting out based on text information within a page, OCR processing is performed for the character image in the specified range and based on the obtained OCR results, an area to be blotted out for the character image is re-set. In the following, detailed explanation is given along the flow in FIG. 8.

Figure 9:
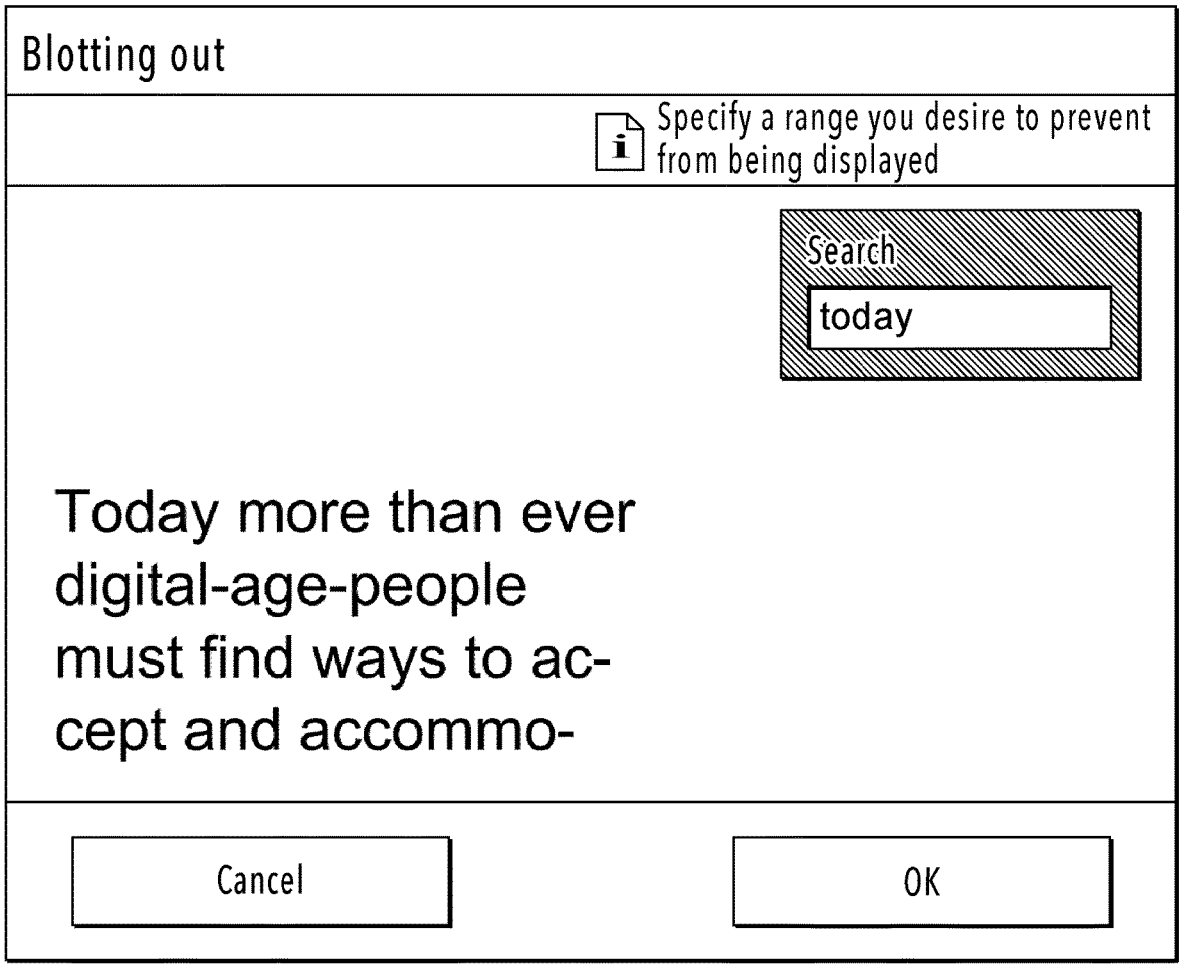
FIG. 9 is a diagram showing an example of a UI screen that is used in the second embodiment.
Figure 10:
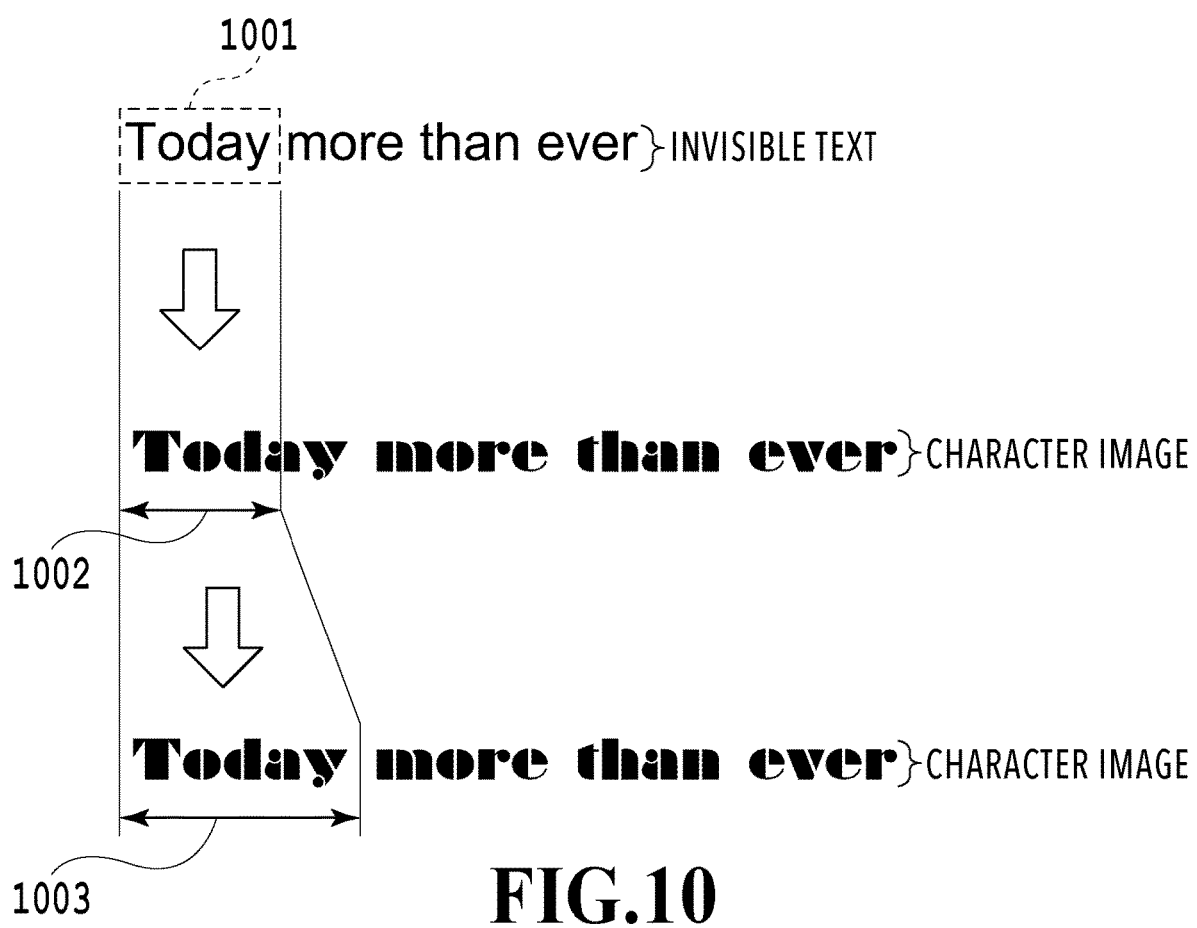
FIG. 10 is a diagram explaining a process of blotting out processing of the second embodiment.

At step 801, on the UI screen displayed on the display device 512, specification of a character string that a user desires to prevent from being displayed by performing blotting out within a page is received via the input device 510, such as a keyboard. FIG. 9 shows an example of the UI screen that is used in the present embodiment. Then, search processing to determine whether the specified character string exists within the page is performed and the portion corresponding to the hit character string is set as an area to be blotted out. FIG. 10 shows a specific example. As a result of an area to be blotted out being set in accordance with the character string hit in the search, for the invisible text, a character string portion 1001 of "Today", and for the character image, an image area 1002 of "Tod" and "a" whose part is lost are the target of blotting out, respectively.

At step 802, OCR processing is performed for the set area to be blotted out portion in the character image within the page. In the example in FIG. 10, it is possible to extract the character string of "Tod" by OCR processing without any problem, but for "a", another character is extracted or OCR processing results in an error. Then, at step 803, whether the OCR processing has succeeded and a character string is extracted is determined. In the case where the OCR processing has succeeded, the processing advances to step 804. On the other hand, in the case where the OCR processing has failed, the processing advances to step 811 and the normal blotting out processing is performed. That is, for the area to be blotted out set at step 801 as a target, the character image is covered with a black rectangle or the like and the invisible text is deleted.

At step 804, the invisible text within the area to be blotted out set at step 801 is acquired. In the example in FIG. 10, the character string of "Today" is acquired. At step 805 that follows, whether the character string of the invisible text acquired at step 804 and the character string extracted by the OCR processing match with each other is determined. In the case where the results of the determination indicate that both the character strings do not match with each other, the processing advances to step 806. For example, in the example in FIG. 10, the character string that is extracted correctly by the OCR processing is "Tod", but the character string of the invisible text acquired at step 804, is "Today". In this case, both the character strings do not match with each other, and therefore, the processing advances to step 806. On the other hand, in the case where both the character strings match with each other, the processing advances to step 811 and the normal blotting out processing is performed. That is, for the area to be blotted out set at step 801 as a target, the character image is covered with a black rectangle or the like and the invisible text is deleted.

At step 806, as in the case with step 607 described previously, for the character image existing in the area to be blotted out set at step 801, a character string row of interest is determined. That is, in the case where a plurality of character string rows exists in the area to be blotted out, the character string row is determined as the character string row of interest in the order, for example, from the character string row whose position coordinate is the highest, and in the case where only one character string row exists, the character string row is determined as the character string row of interest as it is. Further, the character string row here is not limited to the range of the search character string specified by a user, but the entire row is the target. In the example in FIG. 10, the search character string specified by a user is "Today", but what is determined as the character string row of interest here is the entire character string row of "Today more than ever".

At step 807, the OCR processing is performed for the range (for example, for the full width of the character string row of interest) wider in the width direction than the area set at step 601 of the character string row of interest of the character image. That is, the OCR processing is reperformed for the extended character image area as a target, which exceeds the range of the character string a user has searched for. For example, in the case where the target area of the OCR processing is set as the full width of the character string row of interest, in the example in FIG. 10, the entire character string row "Today more than ever" is the target of the OCR processing. However, as in the case of step 608 of the first embodiment, the processing target is not limited to the full width. For example, it may also be possible to determine the target area of the OCR processing by specifying in advance the area as a range twice in the width direction the area set at step 801 and the like, and to take the full width only in the case where the doubled range exceeds the full width. Further, it may also be possible to extend the target area to certain extent (for example, about three-tenths of the height) also in the vertical direction. In the case where the character string is written from top to bottom, the area extended (for example, up to the full height) in the height direction of the character string row of interest is the target area of the OCR processing.

At step 808, whether the same character string as the search character string input by a user exists in the character string extracted by the OCR processing at step 807 is determined. In the example in FIG. 10 described previously, in the character string "Today more than ever" as the OCR results at step 807, the character string "Today" relating to the search is included, and therefore, it is determined that the same character string exists. In the case where the results of the determination indicate that the same character string exists, the processing advances to step 809. On the other hand, in the case where the same character string does not exist, the processing advances to step 810.

At step 809, the range of the same character string as the character string relating to the search of the character string extracted by the OCR processing at step 807 is re-set as a new area to be blotted out for the character image. In the case of FIG. 10, a range 1003 of "Today" of the character string "Today more than ever" in the character image is re-set as a new area to be blotted out for the character image corresponding to the character string row of interest. That is, the area to be blotted out set at step 801 is not changed and kept effective for the invisible text and only for the character image, the range thereof is changed.

At step 810, whether there is an unprocessed character string row in the character image existing in the area to be blotted out set at step 801 is determined. In the case where there is an unprocessed character string row, the processing returns to step 807, and the next character string row of interest is set and the processing is continued. On the other hand, in the case where all the character string rows have been processed, the processing advances to step 811.

At step 811, the blotting out processing is performed for the area to be blotted out set at step 801 (or re-set at step 809) as a target. That is, the character image is covered with a black rectangle or the like and the invisible text is deleted. In the example in FIG. 10 described previously, for the invisible text, the portion of "Today" relating to the search is deleted and only "more than ever" is left and for the corresponding character image, the image area of "Today" is covered with a black rectangle or the like.

The above is the contents of the operation control of the electronic document editor 410 according to the present embodiment. Due to this, also in the case where an area to be blotted out is set based on invisible text that hits the search character, it is made possible to perform blotting out so that there occurs no discrepancy between the character string of the invisible text and the character image as in the case with the first embodiment.

According to the present invention, it is possible to appropriately perform blotting out processing for a portion that a user intends to prevent from being displayed for an electronic document having text information on a character string for search, along with image information.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-193520, filed Oct. 3, 2017, which is hereby incorporated by reference wherein in its entirety.

What is claimed is:

1. An information processing apparatus having a blotting out function of an electronic document, the information processing apparatus comprising:
    a setting unit configured to set an area to which blotting out processing is applied, wherein the area is specified by a user; and
    a blotting out processing unit configured to fill the inside of the area set by the setting unit for a character image object and to delete text information within the area set by the setting unit for a text object, of objects included in the electronic document, wherein
    in a case where the electronic document is an electronic document in a format searchable for a character string and where a character string obtained by performing optical character recognition (OCR) processing for a character image object existing in the area and a character string of an invisible text object existing in the area do not match with each other, the setting unit performs re-setting of an area to which blotting out processing is applied for at least one of the character image object and the invisible text object so that both the character strings match with each other.

2. The information processing apparatus according to claim 1, further comprising:
    a user interface that receives the specification by the user based on the character image object.

3. The information processing apparatus according to claim 2, wherein
    in a case where a plurality of character string rows exists within the area, the setting unit performs the re-setting in units of character string rows.

4. The information processing apparatus according to claim 3, wherein
    the setting unit:
        acquires, of a character string row of interest of the plurality of character string rows, a character string of an invisible text object corresponding to a range wider in the width direction than the area; and
        performs the re-setting of a range of a character string of the acquired character string, which is the same as the character string obtained by the OCR processing, as an area to which blotting out processing is applied for an invisible text object corresponding to the character string row of interest.

5. The information processing apparatus according to claim 4, wherein
    the range wider in the width direction than the area of the character string row of interest of the plurality of character string rows is a range of the full width of the character string row of interest.

6. The information processing apparatus according to claim 1, further comprising
    a user interface that receives the specification by the user based on the invisible text object.

7. The information processing apparatus according to claim 6, wherein
    in a case where a plurality of character string rows exists within the area, the setting unit performs the re-setting in units of character string rows.

8. The information processing apparatus according to claim 7, wherein
    the setting unit:
        performs OCR processing again for a character image object corresponding to an area wider at least in the width direction than the area of a character string row of interest of the plurality of character string rows; and
        performs the re-setting of a range of a character string, which is the same as the character string obtained by the OCR processing performed again, as an area to which blotting out processing is applied for a character image object corresponding to the character string row of interest.

9. The information processing apparatus according to claim 8, wherein the area wider at least in the width direction than the area of a character string row of interest of the plurality of character string rows is an area extended to the full width of the character string row of interest.

10. The information processing apparatus according to claim 8, wherein
the area wider at least in the width direction than the area of a character string row of interest of the plurality of character string rows is an area extended also in the height direction of the character string row of interest.

11. A control method of an information processing apparatus having a blotting out function of an electronic document, the control method comprising the steps of:
setting an area to which blotting out processing is applied, wherein the area is specified by a user; and
performing blotting out processing to fill the inside of the area set at the setting step for a character image object and to delete text information within the area set at the setting step for a text object, of objects included in the electronic document, wherein
at the setting step, in a case where the electronic document is an electronic document in a format searchable for a character string and where a character string obtained by performing optical character recognition (OCR) processing for a character image object existing in the area and a character string of an invisible text object existing in the area do not match with each other, an area to which blotting out processing is applied for at least one of the character image object and the invisible text object is re-set so that both the character strings match with each other.

12. A non-transitory computer readable storage medium storing a program for causing a computer to perform a control method of an information processing apparatus having a blotting out function of an electronic document, the control method comprising the steps of:
setting an area to which blotting out processing is applied, wherein the area is specified by a user; and
performing blotting out processing to fill the inside of the area set at the setting step for a character image object and to delete text information within the area set at the setting step for a text object, of objects included in the electronic document, wherein
at the setting step, in a case where the electronic document is an electronic document in a format searchable for a character string and where a character string obtained by performing optical character recognition (OCR) processing for a character image object existing in the area and a character string of an invisible text object existing in the area do not match with each other, an area to which blotting out processing is applied for at least one of the character image object and the invisible text object is re-set so that both the character strings match with each other.

13. An information processing apparatus comprising:
a memory that stores a program of a blotting out process; and
a processor that executes the program to perform:
setting an area for an electronic document that includes an image object and invisible text objects, the image object including character images, wherein the area is specified by a user;
performing optical character recognition (OCR) processing for character images existing in the set area to obtain character string of OCR results;
determining, in the invisible text objects, text information corresponding to the obtained character string of the OCR results;
filling the inside of the set area for the image object included in the electronic document; and
deleting the determined text information for the invisible text objects included in the electronic document.

14. The information processing apparatus according to claim 13, wherein the text information corresponding to the obtained character string of the OCR results is determined in a character string row of the invisible text objects corresponding to the set area.

15. An information processing apparatus comprising:
a memory that stores a program of a blotting out process; and
a processor that executes the program to perform:
specifying a first character string as a target of blotting out for an electronic document based on a user's instruction, wherein the electronic document includes invisible text objects and an image object that includes character images;
performing optical character recognition (OCR) processing for the character images to obtain character string of OCR results;
determining, from the obtained character string of OCR results, the same character string as the specified first character string;
filling, for the image object included in the electronic document, the inside of an area of character images corresponding to the same character string determined from the obtained character string of OCR results; and
deleting text information corresponding to the first character string in the invisible text objects included in the electronic document.

16. A non-transitory computer readable storage medium storing a program for causing a computer to perform:
setting an area for an electronic document that includes an image object and invisible text objects, the image object including character images, wherein the area is specified by a user;
performing optical character recognition (OCR) processing for character images existing in the set area to obtain character string of OCR results;
determining, in the invisible text objects, text information corresponding to the obtained character string of the OCR results;
filling the inside of the set area for the image object included in the electronic document; and
deleting the determined text information for the invisible text objects included in the electronic document.

17. A non-transitory computer readable storage medium storing a program for causing a computer to perform:
specifying a first character string as a target of blotting out for an electronic document based on a user's instruction, wherein the electronic document includes invisible text objects and an image object that includes character images;
performing optical character recognition (OCR) processing for the character images to obtain character string of OCR results;
determining, from the obtained character string of OCR results, the same character string as the specified first character string;
filling, for the image object included in the electronic document, the inside of an area of character images corresponding to the same character string determined from the obtained character string of OCR results; and
deleting text information corresponding to the first character string in the invisible text objects included in the electronic document.

\* \* \* \* \*